(12) United States Patent
Lalaoua (10) Patent No.: US 11,000,746 B2
(45) Date of Patent: May 11, 2021

(54) AMERICAN FOOTBALL/RUGBY STADIUM MULTIMEDIA GOALPOST

(71) Applicant: Nabile Lalaoua, Las Vegas, NV (US)

(72) Inventor: Nabile Lalaoua, Las Vegas, NV (US)

( * ) Notice: Subject to any disclaimer, the term of this patent is extended or adjusted under 35 U.S.C. 154(b) by 160 days.

(21) Appl. No.: 16/290,757

(22) Filed: Mar. 1, 2019

(65) Prior Publication Data
US 2019/0192938 A1 Jun. 27, 2019

Related U.S. Application Data

(63) Continuation-in-part of application No. 15/861,327, filed on Jan. 3, 2018, now Pat. No. 10,857,437,
(Continued)

(51) Int. Cl.
*A63B 63/00* (2006.01)
*A63B 71/06* (2006.01)
(Continued)

(52) U.S. Cl.
CPC ........ *A63B 63/008* (2013.01); *A63B 71/0669* (2013.01); *G03B 21/58* (2013.01);
(Continued)

(58) Field of Classification Search
CPC ............ A63B 63/0008; A63B 71/0669; A63B 2220/806; A63B 2220/833; A63B 2243/0066; A63B 2243/007
(Continued)

(56) References Cited

U.S. PATENT DOCUMENTS 3,782,724 A * 1/1974 Rottman ............... E01F 15/141
267/140
4,014,117 A * 3/1977 Vallillee ................. A63B 71/06
33/289
(Continued)

FOREIGN PATENT DOCUMENTS

EA 13955 B1 4/2010
GB 2491862 12/2012
(Continued)

*Primary Examiner* — John E Simms, Jr.
*Assistant Examiner* — Rayshun K Peng (57) ABSTRACT

The American football/rugby stadium multimedia goalpost is an apparatus that enables scoring in American football, herein referred to as football, or rugby. The apparatus is configured to leverage space around the goalpost for displaying advertising promotions and game information. The apparatus includes a goalpost frame, a multimedia bar system, and at least one main computing device. The goalpost frame allows for scoring during football and rugby games. The goalpost frame includes a crossbar, a first upright post, a second upright post, and at least one elevating support. Combined, the first upright post, second upright post, and crossbar define a scoring plane. The at least one main computing device relates to a series of interconnected computers or processors responsible for accepting electrical inputs and converting those inputs into appropriate electrical outputs for use across the apparatus. This configuration allows the apparatus to present advertising and event information to event viewers.

18 Claims, 10 Drawing Sheets

Related U.S. Application Data application No. 16/290,757, which is a continuation-in-part of application No. PCT/IB2018/050711, filed on Feb. 5, 2018.

(60) Provisional application No. 62/710,826, filed on Mar. 1, 2018, provisional application No. 62/498,586, filed on Jan. 3, 2017.

(51) Int. Cl.
*G03B 21/58* (2014.01)
*G03B 29/00* (2021.01)
*G09F 23/00* (2006.01)
*G09F 27/00* (2006.01)

(52) U.S. Cl.
CPC ......... *G03B 29/00* (2013.01); *G09F 23/0066* (2013.01); *G09F 27/00* (2013.01); *A63B 2220/806* (2013.01); *A63B 2220/833* (2013.01); *A63B 2225/74* (2020.08); *A63B 2243/007* (2013.01); *A63B 2243/0066* (2013.01)

(58) Field of Classification Search
USPC ........................................................ 473/478
See application file for complete search history.

(56) References Cited

U.S. PATENT DOCUMENTS

| | | |
|---|---|---|
| 2006/0045499 A1 | 6/2006 | Cheng |
| 2006/0273522 A1* | 12/2006 | Marshall ............ A63B 71/0605 |
| | | 273/407 |
| 2007/0004539 A1 | 1/2007 | Meichner |
| 2007/0184920 A1 | 8/2007 | Mah et al. |
| 2008/0043157 A1* | 2/2008 | Jones ..................... G03B 21/58 |
| | | 348/744 |
| 2011/0257935 A1 | 10/2011 | De Graaf et al. |
| 2016/0107028 A1* | 4/2016 | Hartmann ................ H01Q 7/08 |
| | | 324/207.22 |
| 2017/0113113 A1* | 4/2017 | Cole ..................... A63B 63/00 |
| 2018/0065024 A1* | 3/2018 | Colley ................. G09F 27/005 |

FOREIGN PATENT DOCUMENTS

| | | | |
|---|---|---|---|
| GB | 2568064 A * | 5/2019 | .......... A63B 63/004 |
| RU | 2115958 C1 | 7/1998 | |
| WO | WO2000057970 A1 | 10/2000 | |
| WO | WO2007039056 A2 | 4/2007 | |

\* cited by examiner

AMERICAN FOOTBALL/RUGBY STADIUM MULTIMEDIA GOALPOST

The current application claims a priority to the U.S. Provisional Patent application Ser. No. 62/710,826 filed on Mar. 1, 2018.

The current application is also a continuation-in-part (CIP) application of a U.S. non-provisional application Ser. No. 15/861,327 filed on Jan. 3, 2018. The U.S. non-provisional application Ser. No. 15/861,327 claims a priority to a U.S. provisional application Ser. No. 62/498,586 filed on Jan. 3, 2017.

The current application is also a continuation-in-part (CIP) application of the Patent Cooperation Treaty (PCT) application PCT/IB2018/050711 filed on Feb. 5, 2018. The PCT application PCT/IB2018/050711 claims a priority to a U.S. provisional application Ser. No. 62/498,586 filed on Jan. 3, 2017.

FIELD OF THE INVENTION

The present invention generally relates to a sports apparatus. More specifically, the present American football/rugby stadium multimedia goalpost relates to a device which allows for scoring in American football or rugby. The present invention is equipped with several cameras, advertisement arrangements, projectors, speakers, sensors, and more devices in order to leverage the space surrounding the uprights, crossbar, and support posts.

BACKGROUND OF THE INVENTION

American football, herein referred to as football, is the fastest-growing sport in the world. Combined with rugby's already internationally-established reputation, a significant amount of international viewing time is devoted to watching these two sports. In order to provide meaningful investments to owners and expensive athlete salaries, companies may pay for advertising and promotional materials to appear during games, which results in a large number of potential customers' eyes on the promoted product. To accomplish such a task, advertisement space is created all over the field. Such space is a highly valuable asset to a rugby or football team owner for generating additional advertisement revenue. Particularly teams in the National Football League (NFL), the National Rugby League (NRL), the National Collegiate Athletic Association (NCAA), or other such professional athletics organizations would have interest in providing accommodations for additional advertisements.

Coincidentally, both football and rugby utilize a field with opposing end zones, each with a goalpost, for scoring. The goalpost provides significant, currently untouched opportunity for generation of advertisements. Furthermore, as a crucial element of both football and rugby, the goalpost is currently underprepared for registration of scoring. A point or points scored by a ball passing through the goalpost uprights is determined by the referee or referees. It would be advantageous to have digital markings, such as end line marks, end zone marks, goal line marks, side line marks, hash marks, yard line marks, and more connect to the goalpost to detect the position of the ball. What is needed is a set of football or rugby goalposts that allows for utilization of the space surrounding the uprights as prime advertisement and event information real estate. Further desired is a football or rugby goalpost that is equipped to register the passing of the ball in order to automatically determine scoring.

The present invention addresses these issues. The American Football/Rugby Stadium Multimedia Goalpost has cameras that monitor the position of the ball during the game. A specialized ball interacts with sensors atop the crossbar to provide data regarding whether the ball crosses through the uprights or not. Light-emitting diodes (LEDs), speakers, foghorns, and similar devices are dispersed around the goalpost as a way for the present invention to respond to successful scoring attempts. A projector and screen system allow for projection of advertisements. Advertisements can further be displayed along the uprights, crossbar, and elevating supports of the present invention, and can be holographically projected above the crossbar. The holographic projection design may introduce each team and players by their jersey before each game, followed by the sponsor logo. Each player can be introduced by their name using the speakers and projectors as well, offering a unique spectacle and entertainment purpose before the game, during the game, during break times, and after the game.

The present invention is a new generation stadium goalpost technology to be mounted to the field play in stadiums that address American football leagues, professional sport leagues, Canadian football, rugby, and more. The football goal crossbar is 10 feet high, and the posts are an additional 20 feet high, for a total height of 30 feet. Professional and collegiate-level goal posts are 18 feet 6 inches wide. The American football field length is 120 yards. The playing field is 100 yards (300 feet) long, and each end zone is 10 yards (30 feet) deep. The field is marked with a yard line every 5 yards, and every 10 yards is marked by a field number. The hash marks are 1 yard apart, used to mark each down when the ball is between the yard lines.

DETAILED DESCRIPTION OF THE INVENTION

All illustrations of the drawings are for the purpose of describing selected versions of the present invention and are not intended to limit the scope of the present invention.

Figure 1:
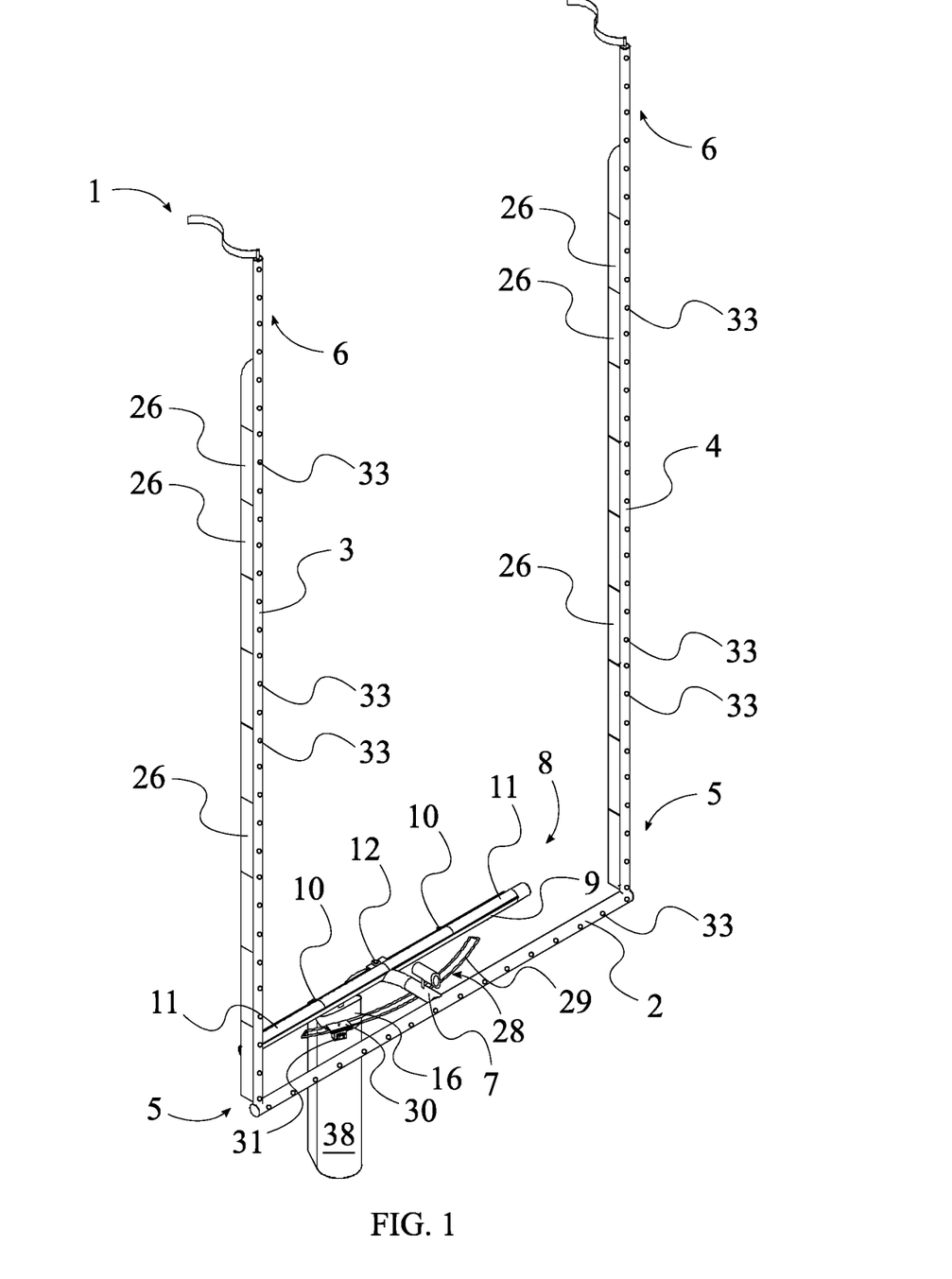
FIG. 1 is a front-left perspective view of the present invention.
Figure 8:
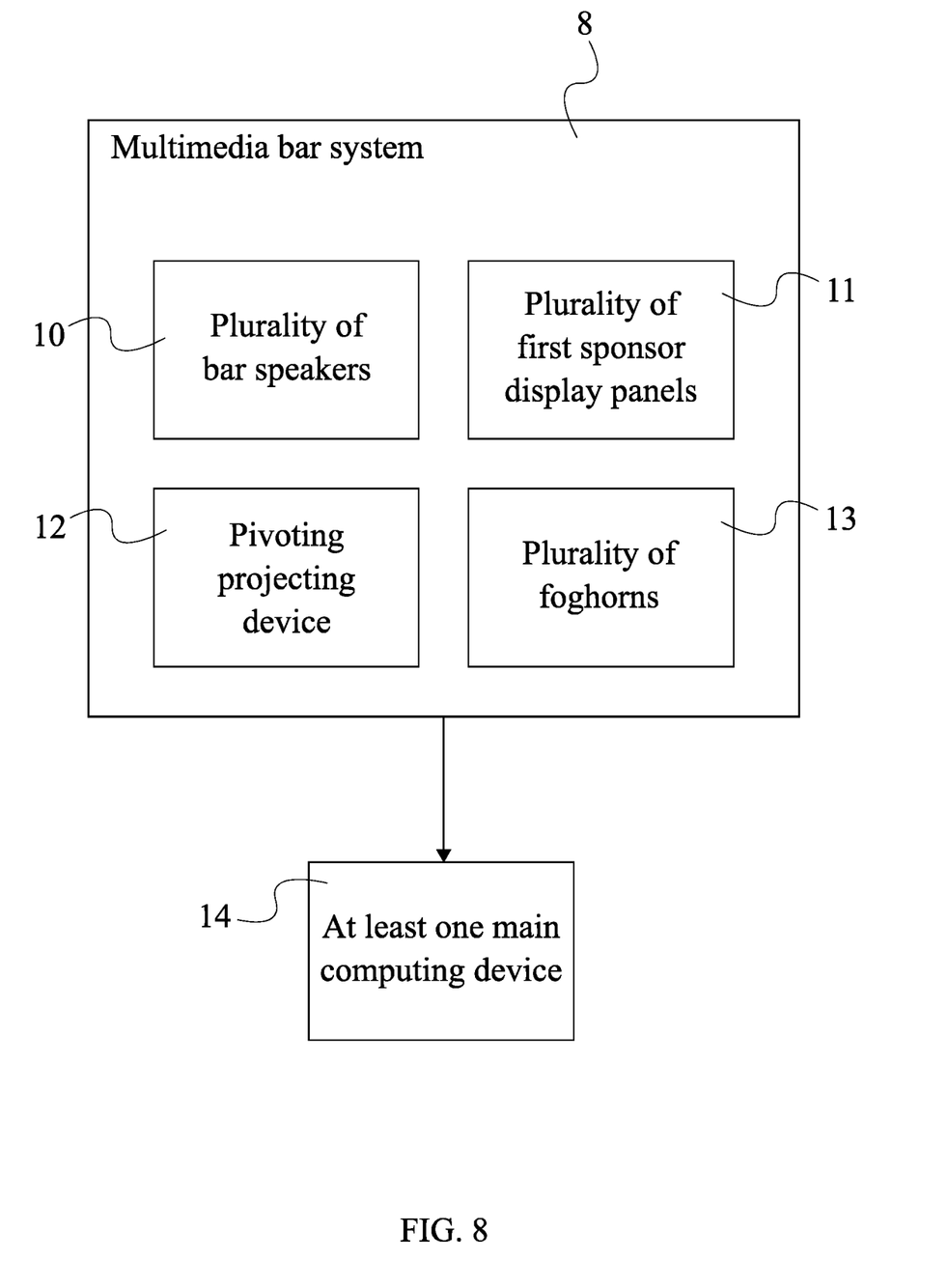
FIG. 8 is a block diagram representing the connection of the multimedia bar system to the at least one main computing device.

The present invention is an American football/rugby stadium multimedia goalpost that is used to enable scoring in American football, herein referred to as football, or rugby. The present invention is configured to leverage space around the goalpost for displaying advertising promotions and game information. The present invention comprises a goalpost frame 1, a multimedia bar system 8, and at least one main computing device 14, as seen in FIG. 1. The goalpost frame 1 is the structure which allows for scoring during football and rugby games and simultaneously allows for positioning of components. The goalpost frame 1 comprises a crossbar 2, a first upright post 3, a second upright post 4, and at least one elevating support 7. The crossbar 2 is a rigid tubular extrusion oriented parallel to the athletic field that defines the minimum height of kick required for an acceptable football or rugby scoring play. The first upright post 3 and the second upright post 4 are rigid tubular extrusions oriented normal to the athletic field which define the left and right limits of an acceptable kick. Combined, the first upright post 3, the second upright post 4, and the crossbar 2 define a scoring plane. Points are awarded when a football or rugby ball passes through the scoring plane. The at least one elevating support 7 is a structural unit which allows for elevation of the crossbar 2 above the athletic field. The multimedia bar system 8 is a set of components that supports advertisements and provides in-game stimuli of different types, including scoring information, as seen in FIG. 8. The at least one main computing device 14 relates to a computer or series of interconnected computers or processors responsible for accepting electrical inputs from the present invention and converting those inputs into appropriate electrical outputs for use across the present invention.

Figure 2:
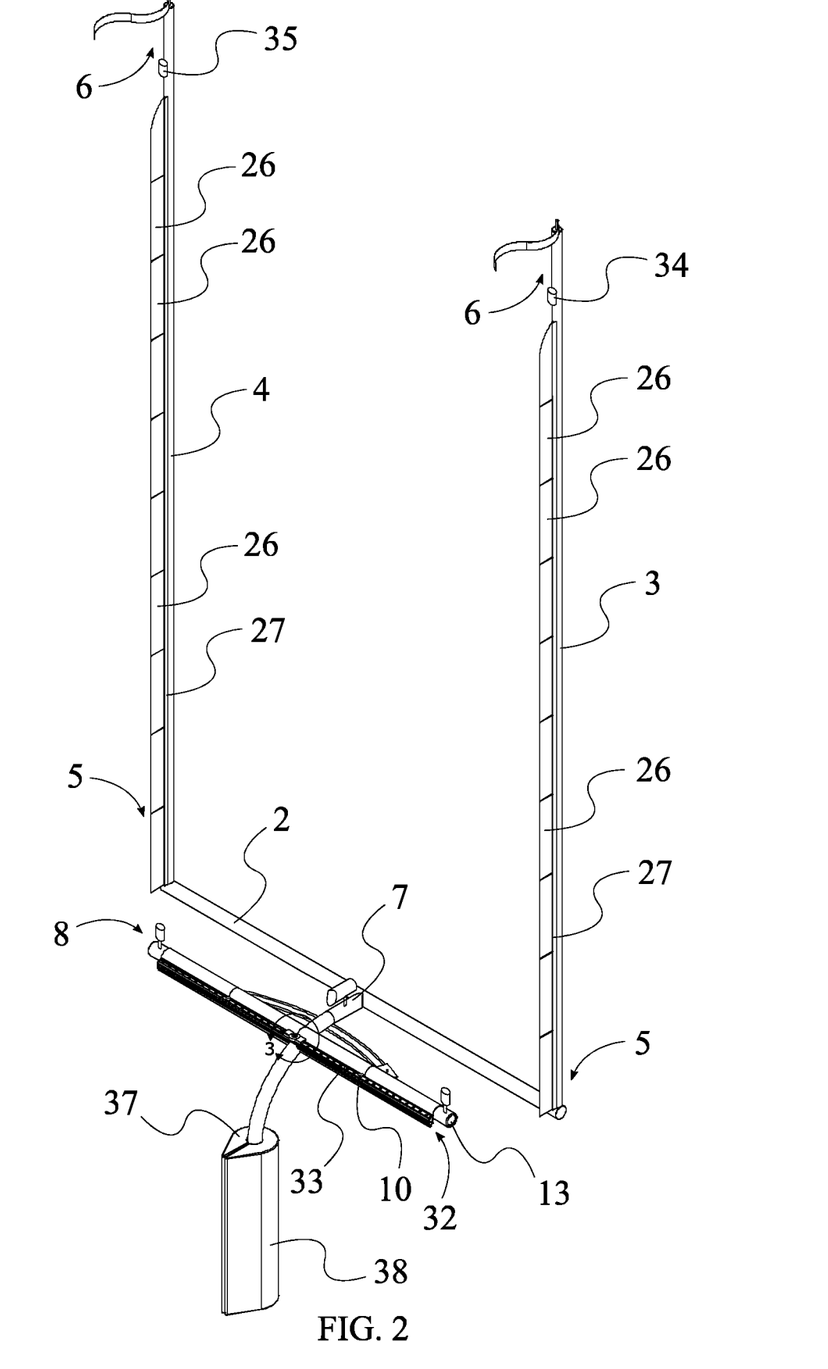
FIG. 2 is a rear-left perspective view of the present invention.

The general configuration of the aforementioned components allows the present invention to present advertising and event information to event viewers. The first upright post 3 and the second upright post 4 each comprise a proximal end 5 and a distal end 6. The proximal end 5 is the post end nearest to the crossbar 2, while the distal end 6 is the post end furthest from the crossbar 2, as seen in FIG. 2. The proximal end 5 of the first upright post 3 is terminally connected to the crossbar 2. Similarly, the proximal end 5 of the second upright post 4 is terminally connected to the crossbar 2, opposite to the proximal end 5 of the second upright post 4. This arrangement allows the crossbar 2 to support the first upright post 3 and the second upright post 4 while offsetting the first upright post 3 from the second upright post 4 by a distance equal to the length of the crossbar 2. The first upright post 3 and the second upright post 4 are positioned perpendicular to the crossbar 2. This arrangement results in the desired configuration of the first upright post 3 and the second upright post 4 being vertically oriented and consequently oriented normal to the field. The at least one elevating support 7 is laterally connected to the crossbar 2. This arrangement enables the scoring plane to be lofted above the ground. The multimedia bar system 8 is mounted parallel and offset to the crossbar 2. In this way, the multimedia bar system 8 is proximally positioned to the crossbar 2, which is a particularly high-attention area during a football or rugby game. The multimedia bar system 8 is electronically connected to the at least one main computing device 14. This arrangement allows the at least one main computing device 14 to communicate with and manage the multimedia bar system 8.

Football and rugby goalposts are fundamentally different in the arrangement of the beams or supports which loft the crossbar 2 above the ground. In one embodiment of the present invention, the at least one elevating support 7 is a gooseneck support, as seen in FIGS. 1 and 2. The gooseneck support is a support which curves into its connection with the crossbar 2. In this embodiment, the present invention comprises at least one rangefinder laser video camera 15, a pivoting projecting device 12, and at least one speaker 16. The at least one rangefinder laser video camera 15 is a visual recording device that captures motion during the rugby or football game. The pivoting projecting device 12 is a holographic projector that displays items or promotions between the first upright post 3 and the second upright post 4. The at least one speaker 16 is an audio projection device that allows for amplification and transmission of audio signals to the audience. The at least one rangefinder laser video camera 15 is pivotably mounted to the gooseneck support. This arrangement enables the at least one rangefinder laser video camera 15 to locate the position of the ball at various angles relative to the present invention. The pivoting projecting device 12 and the at least one speaker 16 are laterally connected to the gooseneck support, adjacent from the multimedia bar system 8. In this way, the pivoting projecting device 12 is able to display advertisements to the crowd and external cameras at various angles. Similarly, the at least one speaker 16 is positioned to project various sounds and information to the viewers both present at the event and those watching on their televisions from afar. The at least one rangefinder laser video camera 15, the pivoting projecting device 12, and the at least one speaker 16 are electronically connected to the at least one main computing device 14. This arrangement allows the at least one main computing device 14 to control the projection direction of the pivoting projecting device 12. This arrangement further allows the at least one main computing device 14 to control the functionalities of the at least one rangefinder laser video camera 15, the pivoting projecting device 12, and the at least one speaker 16.

In another embodiment of the present invention, the at least one elevating support 7 is a pair of vertical posts. The pair of vertical posts is a set of two tubular members that directly support the crossbar 2 above the ground. In this way, the present invention is equipped to perform as a standard rugby goalpost.

Figure 3:
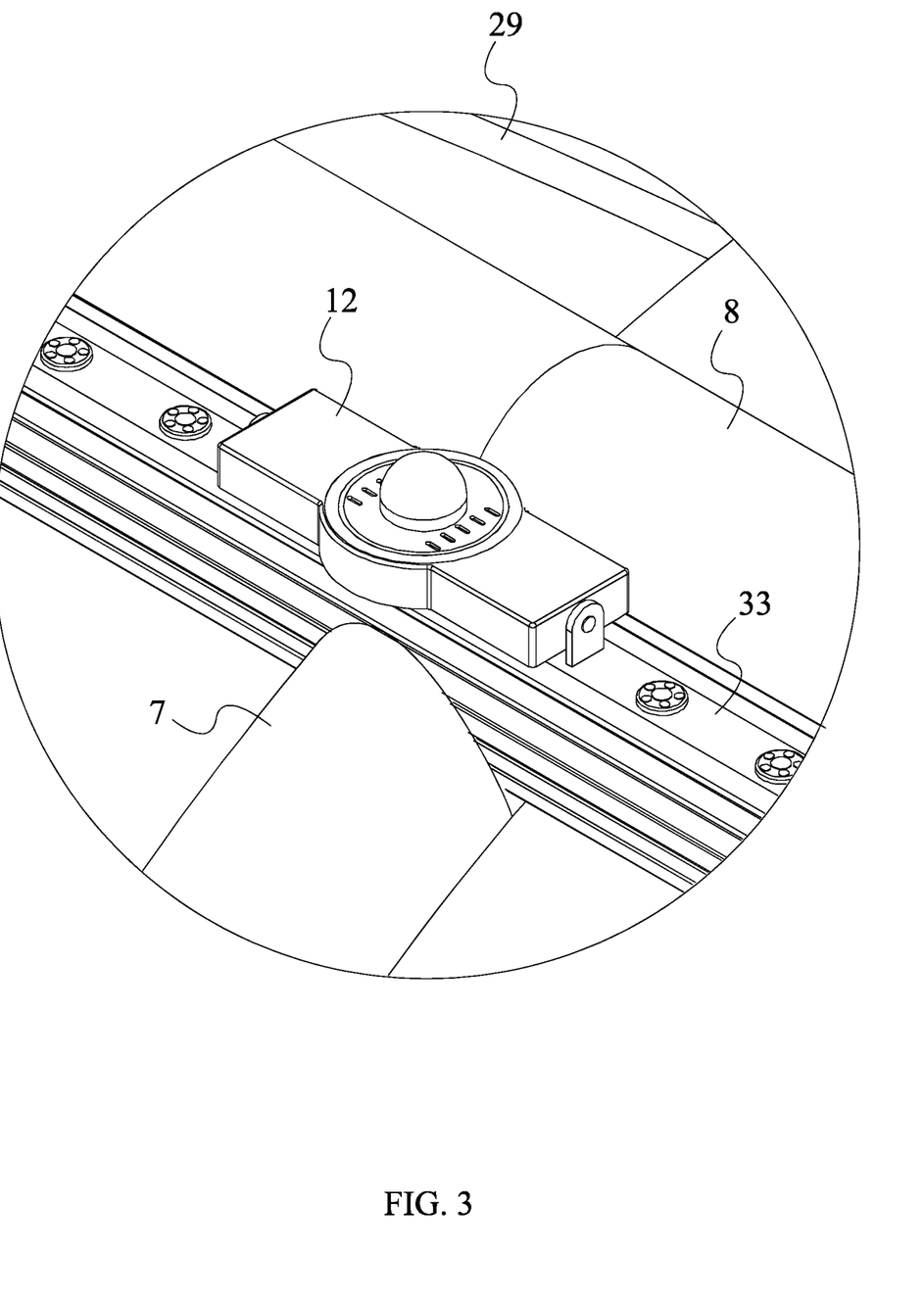
FIG. 3 is a detailed view of the pivoting projecting device taken about circle 3 in FIG. 2.

The multimedia bar must be equipped to serve as a base for several advertising and various display devices. To this end, the multimedia bar system 8 comprises a bar body 9, a plurality of bar speakers 10, a plurality of first sponsor display panels 11, a pivoting projecting device 12, and a plurality of foghorns 13. The bar body 9 is the physical structure upon which the plurality of bar speakers 10, the plurality of first sponsor display panels 11, the pivoting projecting device 12, and the plurality of foghorns 13 are mounted or otherwise connected. The plurality of first sponsor display panels 11 is a set of displays that show content, including advertisements, game information, and more, to the crowd, in either electronic or banner form. The plurality of foghorns 13 is a set of pressurized air-based sound-amplifying devices. The plurality of first sponsor display panels 11 is distributed along the bar body 9. This arrangement allows for clear visibility of the plurality of first sponsor display panels 11 to viewers. The plurality of bar speakers 10 is laterally connected to the bar body 9. The plurality of bar speakers 10 is positioned offset from each other, allowing for constructive interference of sound waves to improve amplification of the sounds emitted from the plurality of bar speakers 10. Each of the plurality of bar speakers 10 is oriented away from the bar body 9. This arrangement further enhances the ability of emitted sound to disperse upon the listening crowd. The pivoting projecting device 12 is positioned at a midpoint of the bar body 9, as seen in FIG. 3. In this way, the pivoting projecting device 12 holographically projects information above or below the crossbar 2, where the projection is maximally visible in the arena and on television. The plurality of foghorns 13 is terminally mounted within the bar body 9. Further, the plurality of foghorns 13 is oriented away from the bar body 9. This arrangement allows the plurality of foghorns 13 to project sound blasts in opposite directions. The plurality of first sponsor display panels 11, the plurality of bar speakers 10, the pivoting projecting device 12, and the plurality of foghorns 13 each are electronically connected to the at least one main computing device 14. This arrangement further allows the at least one main computing device 14 to control the functionalities of the plurality of first sponsor display panels 11, the plurality of bar speakers 10, the pivoting projecting device 12, and the plurality of foghorns 13. In another embodiment, the plurality of first sponsor display panels 11 is a set of banners or flags which are not connected to the at least one main computing device 14.

Figure 4:
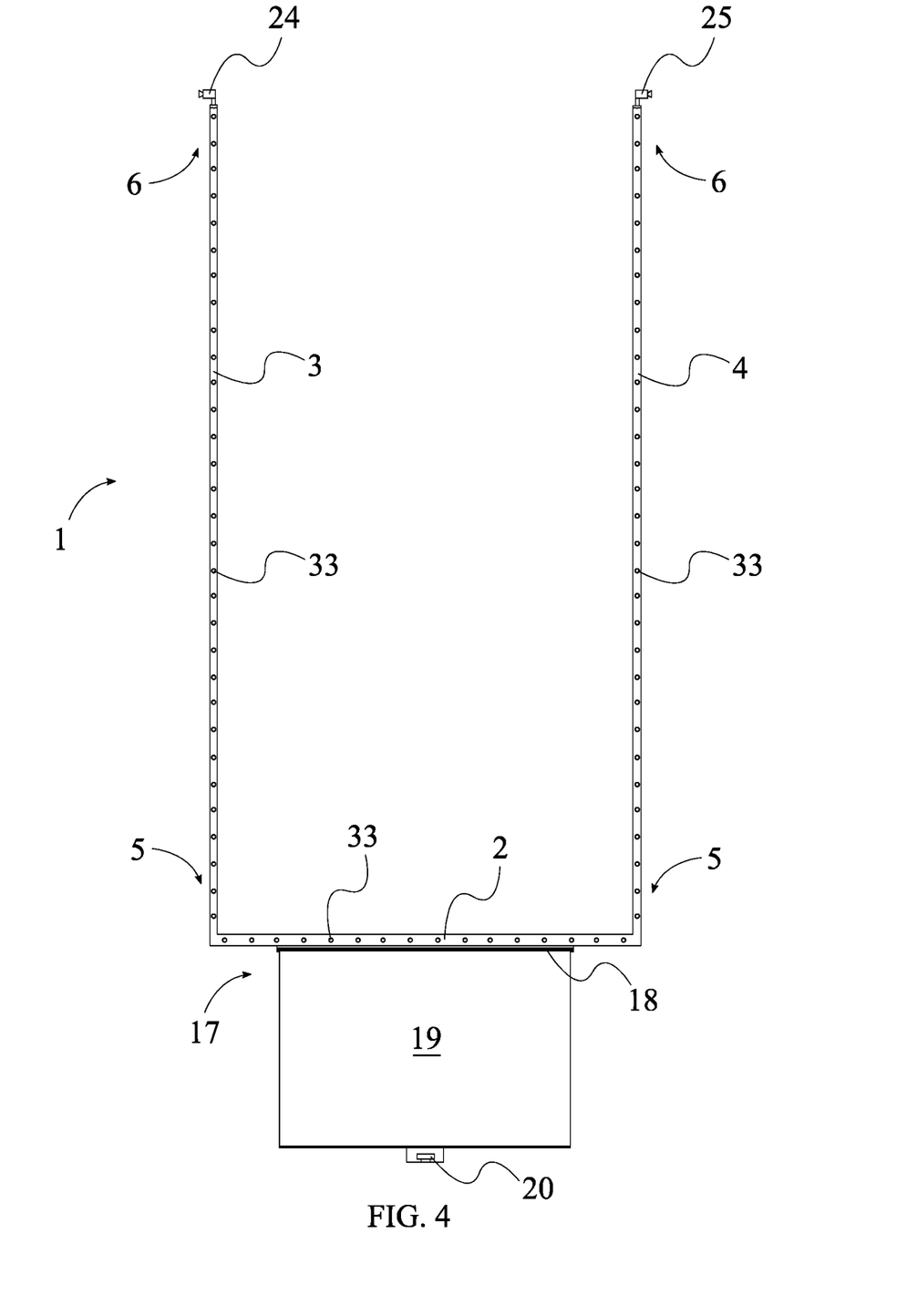
FIG. 4 is a front view of the present invention.
Figure 9:
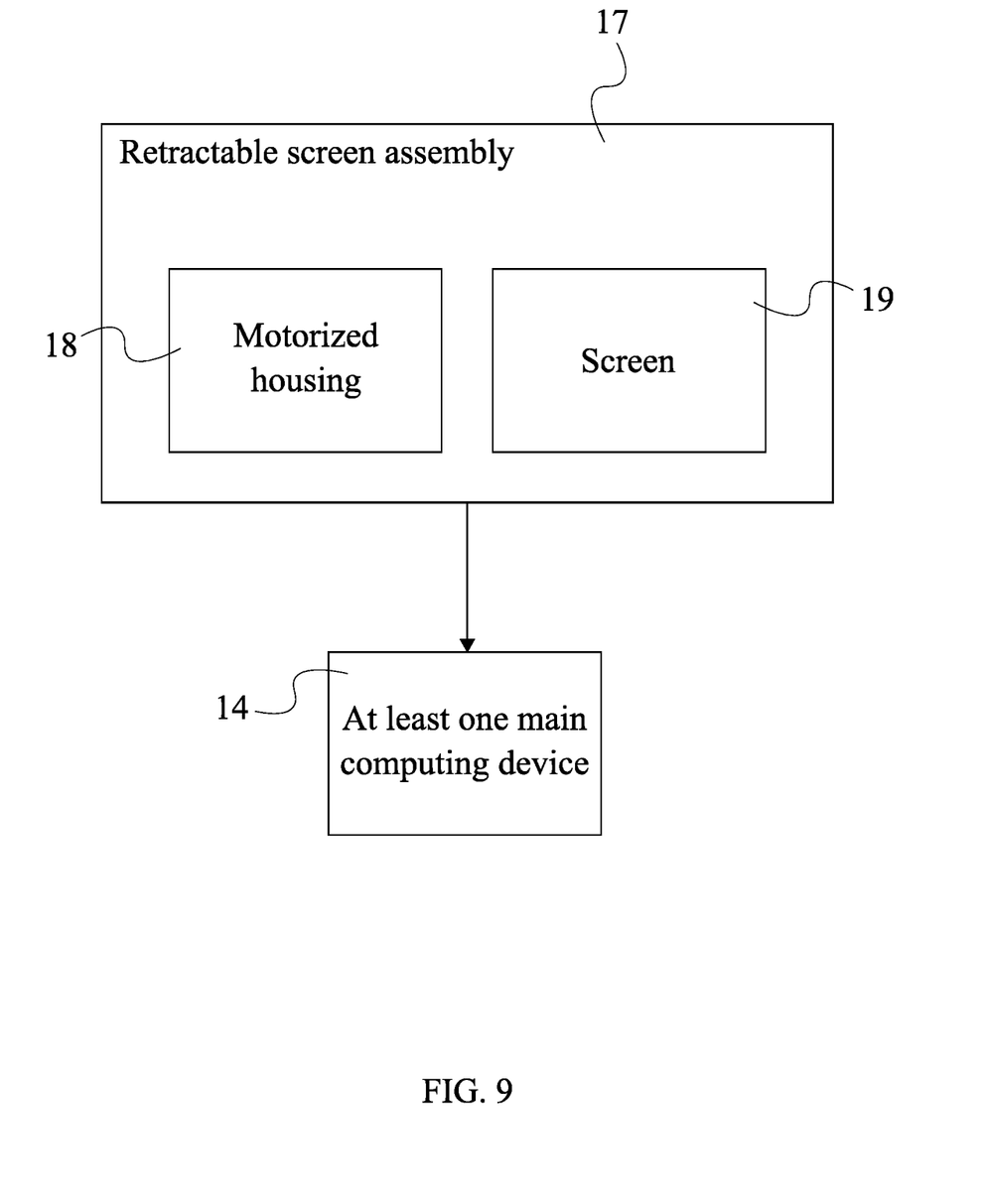
FIG. 9 is a block diagram representing the connection of the retractable screen assembly to the at least one main computing device.

The owner of the stadium or field may desire to display information beneath the crossbar 2. To this end, the present invention comprises a retractable screen assembly 17. The retractable screen assembly 17 is a set of components that allow for images to be displayed via light projection. The retractable screen assembly 17 comprises a motorized housing 18 and a screen 19, as seen in FIG. 4. The motorized housing 18 is a container that allows for storage of the screen 19. The screen 19 is a flexible opaque unit that unfurls from the motorized housing 18. The retractable screen assembly 17 is integrated into the multimedia bar system 8. This arrangement allows the screen 19 to receive signals from the multimedia bar system 8. The screen 19 is operatively coupled to the motorized housing 18, wherein the motorized housing 18 is used to externally deploy or internally withdrawn the screen 19 from the motorized housing 18. In this way, the screen 19 can roll and unroll from within the motorized housing 18. In an exemplary embodiment, the screen 19 is electronically connected to the at least one main computing device 14, as seen in FIG. 9. This arrangement allows for the screen 19 to act as a flexible television screen 19, thus providing content for viewers without requiring the use of a projector.

Figure 5:
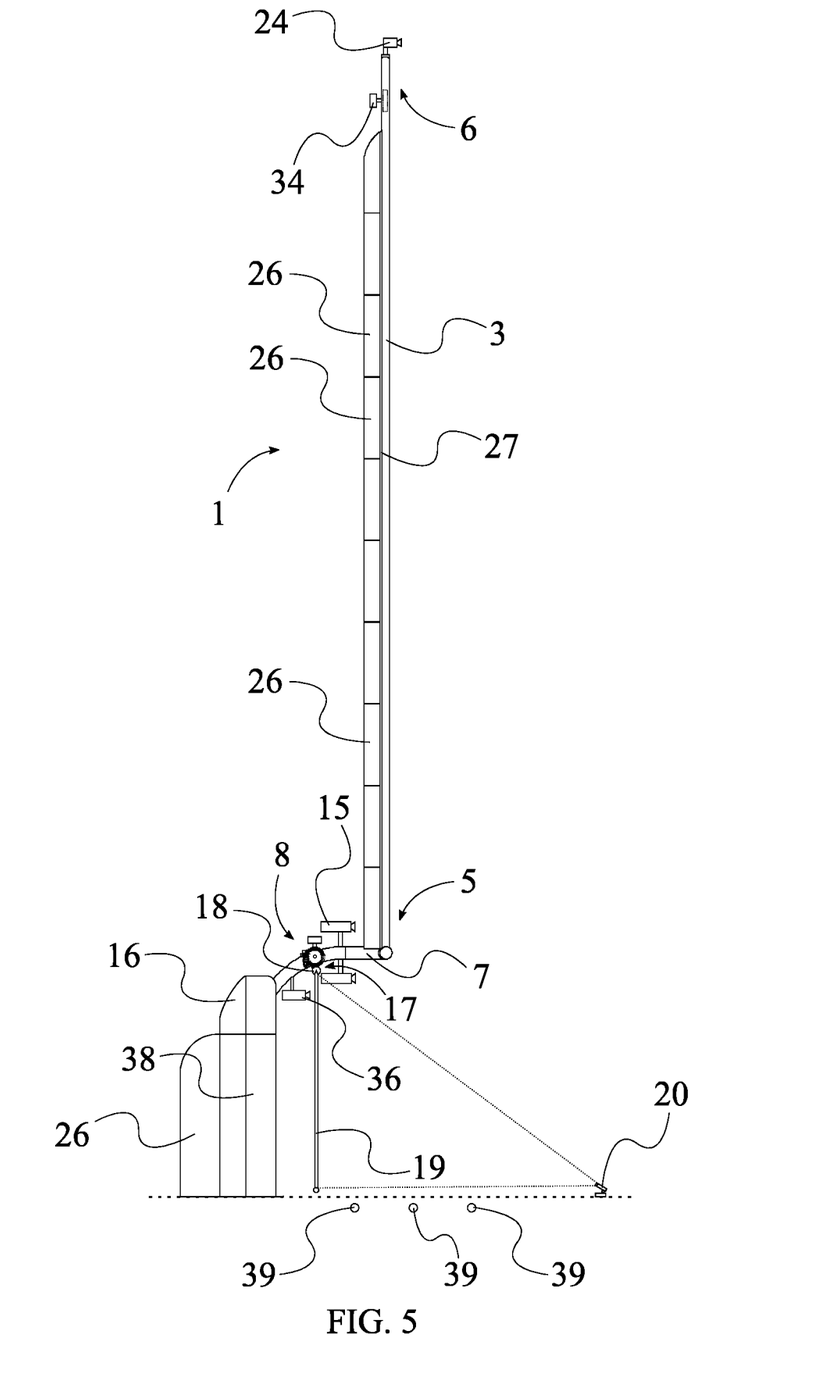
FIG. 5 is a left view of the present invention showing the retractable underground projector.

The retractable screen assembly 17 works in conjunction with light-projecting devices. To this end, the present invention comprises a retractable underground projector 20. The retractable underground projector 20 is a light-emitting projecting tool capable of concealing underground, where the retractable underground projector 20 cannot interfere with game performance, as seen in FIG. 5. The retractable underground projector 20 is positioned offset from the at least one elevating support 7. In this way, the retractable underground projector 20 is able to project images onto the screen 19 from a distance. The retractable underground projector 20 is oriented towards the retractable screen assembly 17. This allows the retractable underground projector 20 to aim light for display towards the retractable screen assembly 17. The retractable underground projector 20 is in optical communication with the screen 19. This arrangement allows the retractable underground projector 20 to display visual information upon the screen 19.

Figure 7:
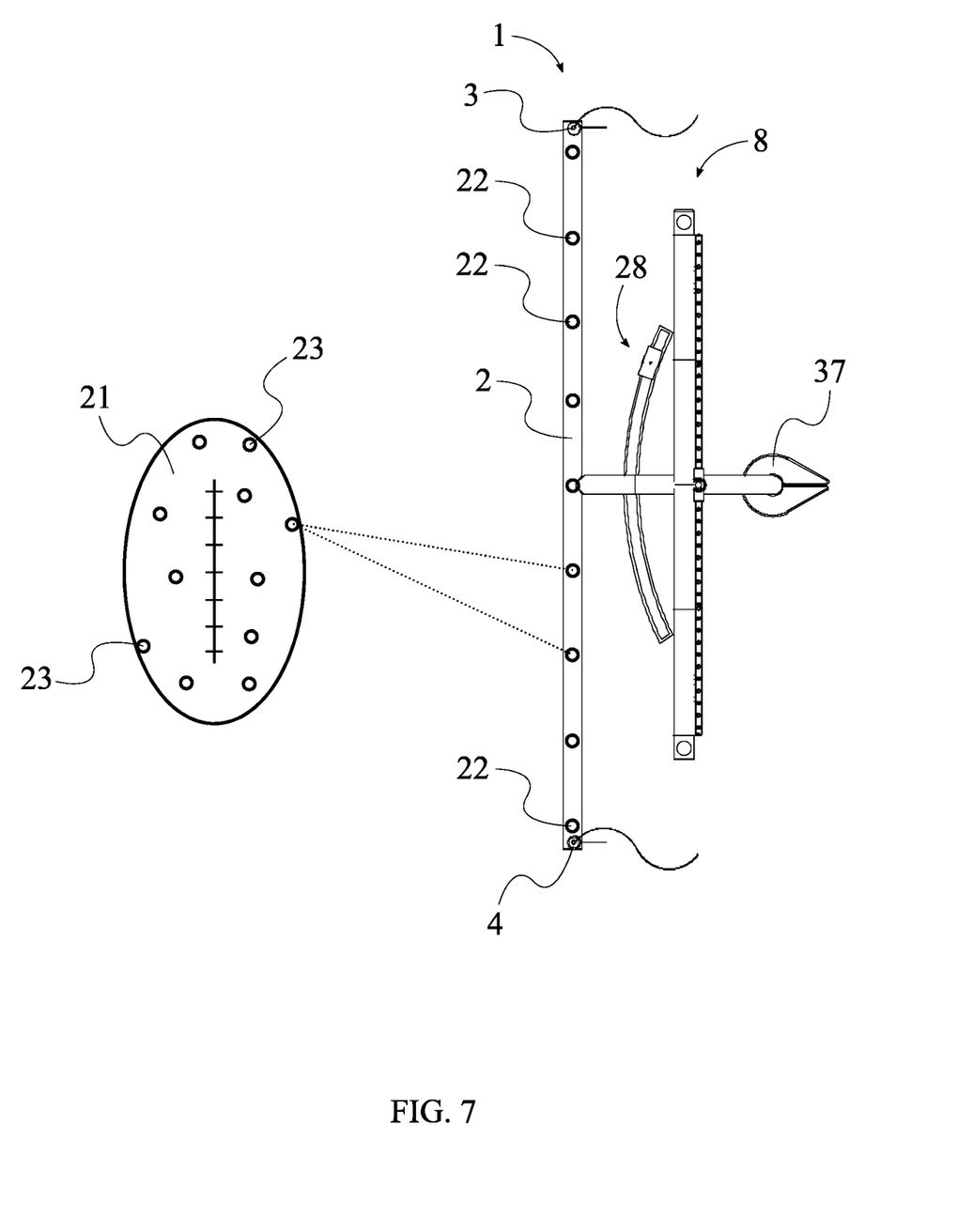
FIG. 7 is a top view of the present invention showing the sports ball and the magnetic sensor array.

In order to track scoring, the present invention must be equipped to register the football or rugby ball when the football or rugby ball passes between the first upright post 3 and the second upright post 4 or crosses over the crossbar 2. To this end, the present invention comprises a sports ball 21, a magnetic sensor array 22, and a plurality of magnets 23, as seen in FIG. 7. The sports ball 21 is a device which allows athletes to play football or rugby. The magnetic sensor array 22 is a set of sensors that detect the presence of a magnetic field. In an exemplary embodiment, the magnetic sensor array 22 is a set of Hall-effect sensors. The plurality of magnets 23 is a set of rigid units which generate a magnetic field. The plurality of magnets 23 is integrated into the sports ball 21. This arrangement allows the sports ball 21 to emit a magnetic field. By keeping the plurality of magnets 23 concealed within the sports ball 21, the sports ball 21 can be made indistinguishable from conventional footballs or rugby balls. The magnetic sensor array 22 is integrated into the goalpost frame 1. In this way, the magnetic sensor array 22 is positioned to register passing magnetic fields. The magnetic sensor array 22 is operatively coupled to the plurality of magnets 23, wherein the magnetic sensor array 22 is used to magnetically sense a proximity of the plurality of magnets 23 to the goalpost frame 1. This arrangement allows the magnetic sensor array 22 to register the passing of the sports ball 21 through the goalpost frame 1. The magnetic sensor array 22 is electronically connected to the at least one main computing device 14. In this way, information captured from the magnetic sensor array 22 are interpreted and subsequently transmitted by the at least one main computing device 14.

Figure 6:
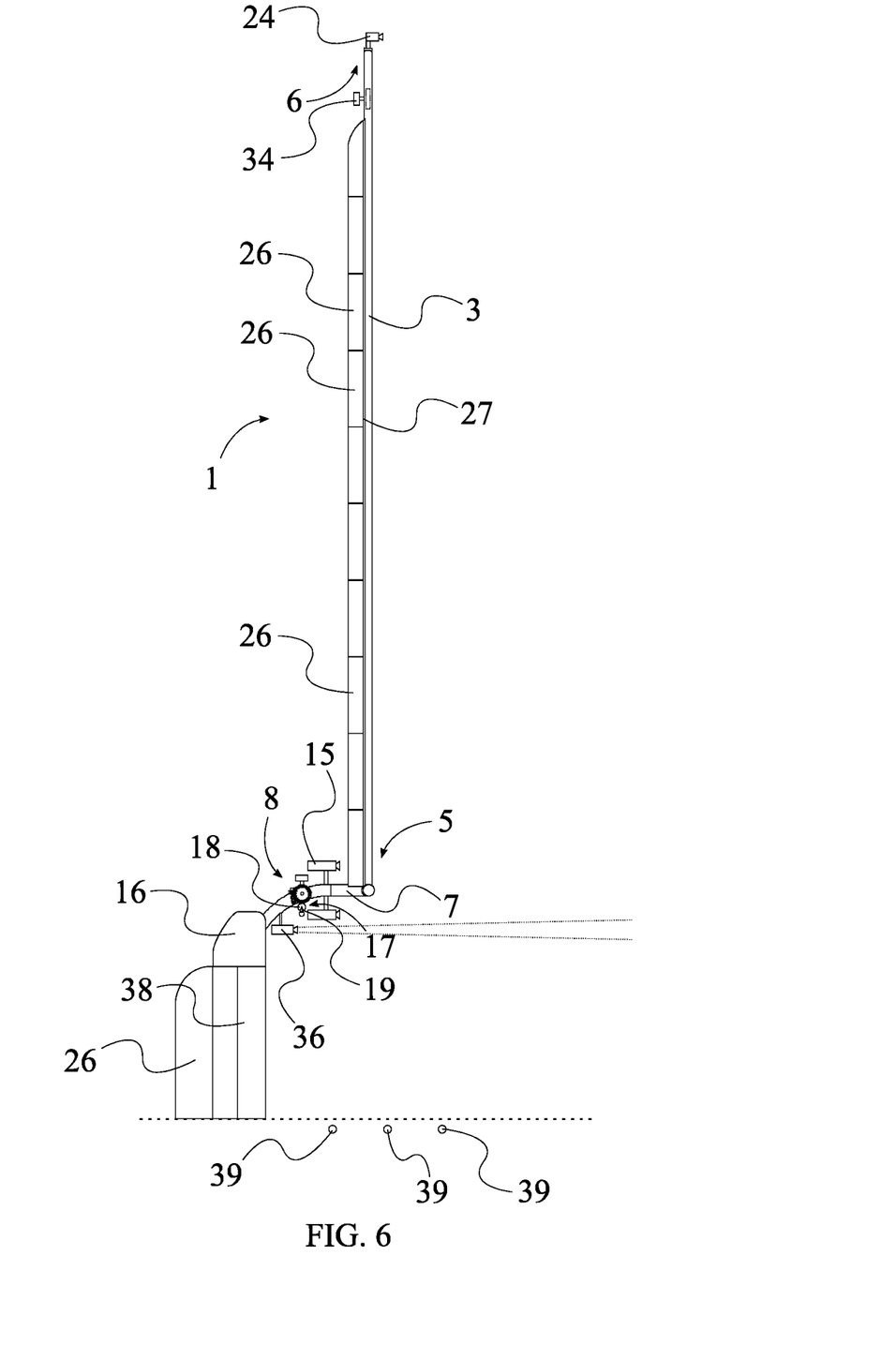
FIG. 6 is a left view of the present invention showing the long-distance projector.

The present invention must be able to track and follow the action in order to project or display the events upon the field. To this end, the present invention comprises a sports ball 21 and at least one rangefinder laser video camera 15, as seen in FIG. 6. The at least one rangefinder laser video camera 15 is an image capture device that can track items from a long distance by sending and receiving laser signals. The at least one rangefinder laser video camera 15 is pivotably connected to the multimedia bar system 8. This arrangement allows the at least one rangefinder laser video camera 15 to swivel to locate items on the athletic field. The at least one rangefinder laser video camera 15 is in optical communication with the sports ball 21. This allows the present invention to monitor the sports ball 21 during athletic games. The at least one rangefinder laser video camera 15 is electronically connected to the at least one main computing device 14. In this way, information captured from the at least one rangefinder laser video camera 15 is available to the at least one main computing device 14 for subsequent use in signal delivery throughout the present invention. The at least one rangefinder laser video camera 15 can also be used to determine the distance of the sports ball 21 to the goalpost frame 1 and subsequently relay that information to the at least one main computing device 14.

In order to further monitor action during the game, the present invention must be equipped with cameras that have a view of the full field. The present invention comprises a sports ball 21, a first upright camera 24, and a second upright camera 25, as seen in FIG. 2. The first upright camera 24 and the second upright camera 25 are image capture devices which work in tandem to capture the field of the rugby or football game. The first upright camera 24 is pivotably connected to the distal end 6 of the first upright post 3. Similarly, the second upright camera 25 is pivotably connected to the distal end 6 of the second upright post 4. In this way, the first upright camera 24 and the second upright camera 25 are raised above the field for an optimal vantage point. The first upright camera 24 and the second upright camera 25 are in optical communication with the sports ball 21. In this arrangement, the first upright camera 24 and the second upright camera 25 are positioned to follow the sports ball 21 around the field. The first upright camera 24 and the second upright camera 25 are electronically connected to the at least one main computing device 14. This arrangement allows data received from the first upright camera 24 and the second upright camera 25 to be processed and utilized for subsequent signal transmission. The first upright camera 24 and the second upright camera 25 combined further allow for generation of three-dimensional images.

The first upright post 3 and the second upright post 4 provide ample space for advertisements. The present invention comprises a plurality of second sponsor display panels 26. The plurality of second sponsor display panels 26 is a set of surfaces that display advertisements along the first upright post 3 and the second upright post 4. The plurality of second sponsor display panels 26 may be a set of unchanging banners or flags with various logos or sponsored information imprinted upon them. The plurality of second sponsor display panels 26 is connected along the first upright post 3, the second upright post 4, and the at least one elevating support 7, as seen in FIGS. 1 and 5. In this way, the plurality of second sponsor display panels 26 is present across the goalpost frame 1 where the plurality of second sponsor display panels 26 cannot interfere with gameplay. The plurality of second sponsor display panels 26 is electronically connected to the at least one main computing device 14. This arrangement allows the plurality of second sponsor display panels 26 to change contents in order to display a variety of advertisements or different messages.

The plurality of second sponsor display panels 26 may still possibly interfere with gameplay in the preceding embodiment. To this end, the present invention comprises at least one display panel housing 27. As seen in FIG. 2, the at least one display panel housing 27 is a container that allows the plurality of second sponsor display panels 26 to retract in towards the first upright post 3 and the second upright post 4. The at least one display panel housing 27 is connected along the first upright post 3 and the second upright post 4. In this way, the first upright post 3 and the second upright post 4 are equipped to handle the retraction of the plurality of second sponsor display panels 26 into the at least one display panel housing 27. The plurality of second sponsor display panels 26 is operatively coupled to the at least one display panel housing 27, wherein the at least one display panel housing 27 is used to externally deploy or internally withdraw the plurality of second sponsor display panels 26 from the at least one display panel housing 27. In this way, the plurality of second sponsor display panels 26 is able to retract in order to provide minimal distraction during scoring plays.

Many cameras are required to capture every angle of a sporting event. To this end, the present invention comprises a visual recording system 28. The visual recording system 28 is a set of components which collects and records visual data about the events occurring during the game. The visual recording system 28 comprises a track 29, a motorized camera mount 30, and a video camera 31, as seen in FIG. 1. The track 29 is an extrusion that allows for restricted movement of the motorized camera mount 30. The motorized camera mount 30 is a unit which slides or rolls along the track 29 and allows for secure connection of the video camera 31. The video camera 31 is a live image capturing device. The visual recording system 28 is positioned offset from the multimedia bar system 8. This arrangement allows full view of the field for the visual recording system 28. The track 29 is laterally mounted to the at least one elevating support 7. In this way, the track 29 is connected stably and safely above the field. The motorized camera mount 30 is slidably connected to the track 29. In this way, the motorized camera mount 30 is able to move to different positions along the track 29 to follow the players. The track 29 may be curved in order to allow the motorized camera mount 30 to slide in order to turn the video camera 31 in different directions. The video camera 31 is attached into the motorized camera mount 30. This arrangement allows the video camera 31 to move to view the field at a low, safe height from the ground. The motorized camera mount 30 and the video camera 31 are electronically connected to the at least one main computing device 14. In this way, the at least one main computing device 14 may send signals directing the position of the motorized camera mount 30 based on received signals from the video camera 31.

Figure 10:
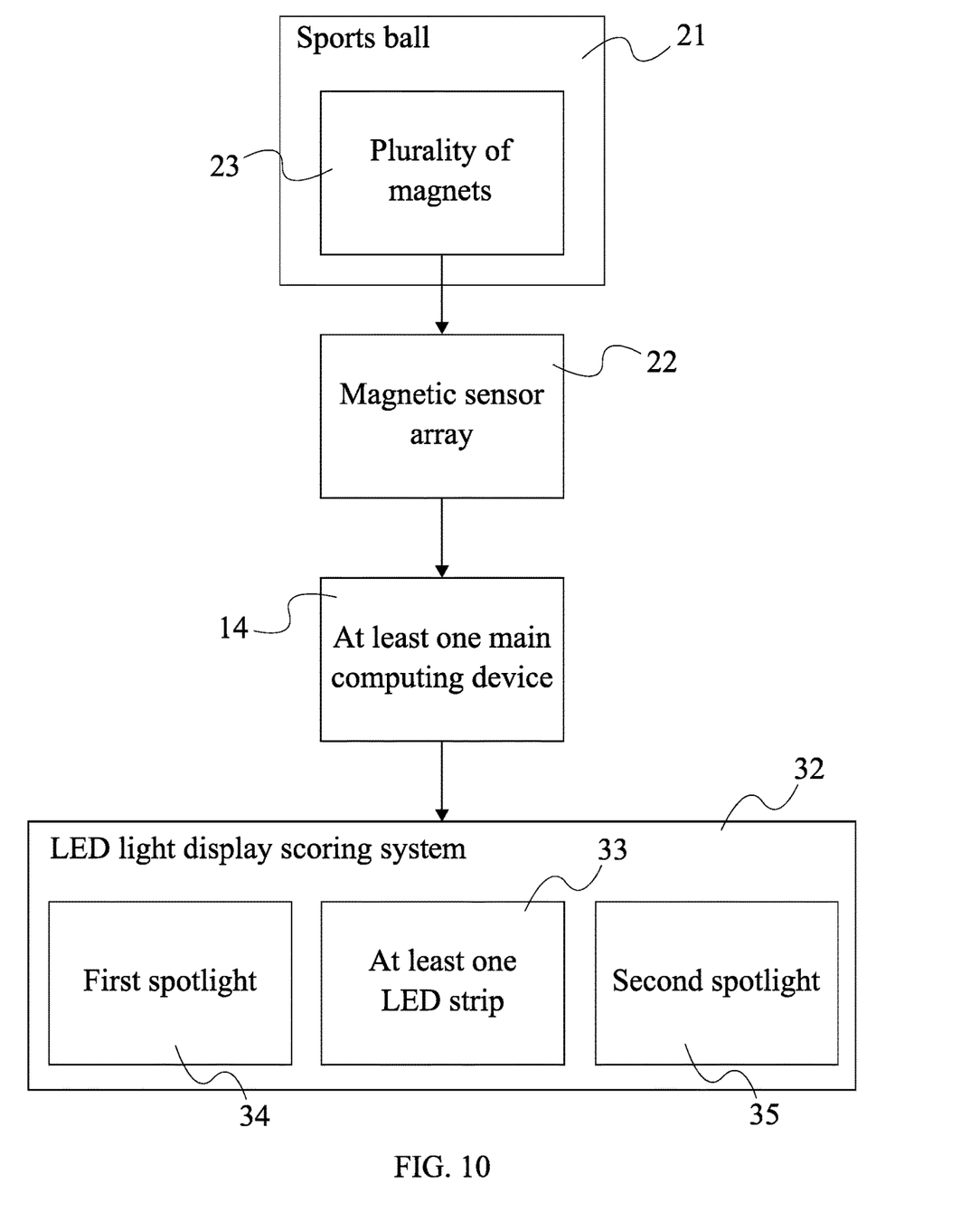
FIG. 10 is a block diagram representing the connection of the sports ball to the LED light display scoring system.

The present invention requires a mechanism for indicating the success or failure of scoring plays. To this end, the present invention comprises a light-emitting diode (LED) light display scoring system 32. The LED light display scoring system 32 is a series of lights and optical indicators that serve to relay information to the audience. The LED light display scoring system 32 is connected adjacent to the goalpost frame 1. This allows the goalpost frame 1 to illuminate with the LED light display scoring system 32. The LED light display scoring system 32 is electronically connected to the at least one main computing device 14. This allows the at least one main computing device 14 to regulate when the LED light display scoring system 32 illuminates, as seen in FIG. 10.

It may be advantageous to utilize several different types of illuminating features to indicate various game-time events. To address this, the LED light display scoring system 32 comprises at least one LED strip 33, a first spotlight 34, and a second spotlight 35, as seen in FIG. 2. The at least one LED strip 33 is a set of insulated multicolor illuminating diodes that activates in varying coordinated patterns. The first spotlight 34 and the second spotlight 35 are high-power lights that illuminate clouds and faraway surfaces. The at least one LED strip 33 is connected along the first upright post 3, the second upright post 4, the crossbar 2, and the multimedia bar system 8. In this way, activation of the at least one LED strip 33 results in an exciting display on the relevant goalpost frame 1. The first spotlight 34 is connected onto the distal end 6 of the first upright post 3. Furthermore, the first spotlight 34 is oriented away from the first upright post 3. This arrangement allows the first spotlight 34 to project up into the sky, creating an effect of extending the length of the first goalpost and simultaneously advertising the game to passersby. The second spotlight 35 is connected onto the distal end 6 of the second upright post 4. Furthermore, the second spotlight 35 is oriented away from the second upright post 4. This arrangement allows the second spotlight 35 to project up into the sky, creating an effect of extending the length of the second goalpost and simultaneously advertising the game to passersby.

In order to take advantage of the field when sports are not being played, the present invention would benefit from further projection mechanisms. To this end, the present invention comprises a long-distance projector 36, as seen in FIG. 6. The long-distance projector 36 is a long-throw projector that can display images across the field or generally over long distances. The long-distance projector 36 is connected onto the multimedia bar system 8. This arrangement allows the long-distance projector 36 to orient itself in such a way that the long-distance projector 36 can project across the field. The long-distance projector 36 is electronically connected to the at least one main computing device 14. In this way, the at least one main computing device 14 can control the position of the long-distance projector 36 and can also collect data received by the long-distance projector 36.

The present invention requires a mechanism for protecting players who are running or moving at high speeds towards the at least one elevating support 7. To this end, the present invention comprises a padding 37, as seen in FIG. 7. The padding 37 is a foam-filled polymeric cushion that absorbs impacts of players who contact the padding 37. The padding 37 is laterally connected around the at least one elevating support 7. This arrangement allows the padding 37 to fully-protect the at least one elevating support 7.

Furthermore, in order to better protect players during athletic events, the present invention further comprises an airbag system 38 and at least one proximity sensor 39. The airbag system 38 prevents heavy impacts from hurting players and prevents players from being compressed against the at least one elevating support 7. The at least one proximity sensor 39 is an electrical device which captures data regarding the distance of objects, as seen in FIG. 5. The airbag system 38 is operatively integrated into the padding 37, wherein the airbag system 38 is used to deploy an airbag from the padding 37 as a player approaches impact with the padding 37. This arrangement ensures that players do not contact the padding 37 at high or dangerous speeds. The airbag system 38 is oriented away from the at least one elevating support 7. This allows the airbag system 38 to deploy without damaging the padding 37 or the at least one elevating support 7. The at least one proximity sensor 39 is positioned offset from the padding 37. In this way, the airbag system 38 can deploy in advance of a large impact, thus ensuring maximal effectiveness. The at least one proximity sensor 39 is preferably positioned underground adjacent from the airbag system 38, allowing the airbag system 38 to activate. The airbag system 38 and the at least one proximity sensor 39 are electronically connected to the at least one main computing device 14. In this way, the at least one main computing device 14 responds to signals from the at least one proximity sensor 39 by actuating the airbag system 38.

In an exemplary embodiment, the owner of the present invention may wish to communicate information directly to users. A mobile application and a plurality of servers enable the user to collect information and send the collected information to users. Such information may include, but is not limited to, advertisements, game information, statistics, weather information, and promotions. In another embodiment, the present invention may include a concealed advertisement mechanism. The concealed advertisement mechanism is a set of advertisement displays positioned behind a pair of hinging doors. The pair of hinging doors is positioned atop the padding 37. This allows the concealed advertisement mechanism to open to reveal advertisements and promotional information and to close during games to protect the display. In an exemplary embodiment, the concealed advertisement mechanism is electronically connected to the at least one main computing device 14 in order to allow the concealed advertisement mechanism to change the displayed message.

Supplemental Description

One miscellaneous aspect of the present invention is an American football field made with digital circuit sensor line marks that connect to each goalpost. The digital circuit sensor line marks are not limited to any field play for any sports or professional sports leagues, regardless of outdoor or indoor field play. Several digital circuit sensor line marks may include any or all of end line marks, sideline marks, end zone marks, hash marks, yard line marks, goal line marks, and more, all being digital and connecting to the goalposts. In this way, if the sports ball 21 exits from the field of play or otherwise crosses a digital circuit sensor line mark, the sports ball 21 will light up with a warning light at the end of the first upright post 3 and the second upright post 4. Such a field may be equipped with a sports ball 21 that is equipped with appropriate sensors. Sponsorship text and logo of a company's product and services may be projected onto the field using 3D projection. Holograms may be projected from the present invention onto any athletic field, possibly projecting the digital circuit sensor line marks onto the field. This may be used during live sport events that are broadcast by any sport television networks and other television channels.

Another miscellaneous aspect of the present invention is a mobile application system. The live video image from the first upright camera 24 and the second upright camera 25 may capture a score, such as a touchdown, goal kick, field goal, or other scoring. The video content is then transmitted to at least one remote server for distribution through a mobile application to various mobile devices in real time using multimedia messaging service (MMS) technology. Upon scoring, a 3D hologram will be projected, announcing the team logo and player name by showing the official jersey in 3D above the goalpost frame 1 above the multimedia bar system 8 and the crossbar 2, and can be seen from any angles around the first upright post 3 and the second upright post 4. The mobile device will receive the live video content of official scoring goal(s), touchdown(s), goal kick(s), field goal(s), and other scoring plays from both teams during the live event. The mobile device may also holographically project information including player jerseys, team logos, scores, advertisements, other logos, and the like from anywhere in the world, regardless of the mobile device location and time zone. The video camera 31, first upright camera 24, second upright camera 25, and the at least one rangefinder laser video camera 15 are designed to capture video images and visual contents from the official scoring goal and send them to the mobile devices using any form of Mobile App or other Digital Methods and technology. Transmitted messages include video, texting, and 3D projection data from any live sport events to mobile devices and television screens. Data is not limited to captured video and images of athletes passing the finish line during various racing sports.

Another miscellaneous aspect of the present invention is that the LED light display scoring system 32 can be mounted to the first upright post 3 and the second upright post 4. A front channel is oriented toward gameplay on the field of play to secure the at least one LED strip 33 while keeping the same smooth surface, diameter, width, and counter of the first upright post 3 and the second upright post 4, as if there was nothing on the surface. With the at least one LED strip 33 positioned in this way, the at least one LED strip 33 can be seen from the exterior of the first upright post 3 and the second upright post 4. The at least one LED strip 33 is not mounted over the first upright post 3 and the second upright post 4 in such a way that the presence of the at least one LED strip 33 would affect game performance; therefore, the first upright post 3 and the second upright post 4 does change when integrating the at least one LED strip 33. The diameters and widths of the first upright post 3 and the second upright post 4 does not change. Such an arrangement may further include the crossbar 2. This ensures that the present invention still complies with various league regulations and athletic standards. The at least one LED strip 33 of the first upright post 3 and the second upright post 4 light up vertically and flash each time there is an official scoring goal for entertainment purposes. The LED light display scoring system 32 can scroll vertically, upwards and downwards along the first upright post 3 and the second upright post 4 and can flash in multiple colors, particularly during the goal kick.

Another miscellaneous aspect of the present invention is that the first spotlight 34 and the second spotlight 35 project yellow- or white-colored laser beam with the same diameter and color of the first upright post 3 and the second upright post 4. Further, a distance of 18.6' between them creates a continuity of the first upright post 3 and the second upright post 4. This makes the first upright post 3 and the second upright post 4 look taller, extending into the sky. Such projection allows for the logo and name of the team to be seen above the athletic stadium from miles away. This is a great way to promote upcoming events and ticketing sales. The yellow color matches the traditional American football goalpost structure using laser beam technology. Similarly, apply the white laser light for rugby to make the first upright post 3 and the second upright post 4 look taller and longer. This projection is not limited in potential colors and directions.

Another miscellaneous aspect of the present invention is that the long-distance projector 36 can be a 3D projection mapping projector. This would allow the long-distance projector 36 to project 3D shapes upon the opposing goalpost, and possibly the crowd, for television broadcasting purposes and advertising. Digital virtual advertising is projected or inserted between the first upright post 3 and the second upright post 4 and over the crossbar 2, facing front to the play field. This allows external broadcasting cameras to capture the image and broadcast on live television during live sport events. This is not limited to soccer goals within the uprights and under the crossbar, or between the crossbar and the goal line mark. The goalpost can thus be used as a digital adverting billboard, preferably before games and during breaks.

Although the invention has been explained in relation to its preferred embodiment, it is to be understood that many other possible modifications and variations can be made without departing from the spirit and scope of the invention as hereinafter claimed.

What is claimed is:

1. An American football/rugby stadium multimedia goalpost comprises:
    a goalpost frame;
    a multimedia bar system;
    at least one main computing device;
    the goalpost frame comprises a crossbar, a first upright post, a second upright post, and at least one elevating support;
    the first upright post and the second upright post each comprise a proximal end and a distal end;
    the proximal end of the first upright post being terminally connected to the crossbar;
    the proximal end of the second upright post being terminally connected to the crossbar, opposite to the proximal end of the second upright post;
    the first upright post and the second upright post being positioned perpendicular to the crossbar;
    the at least one elevating support being laterally connected to the crossbar;
    the multimedia bar system being mounted parallel and offset to the crossbar;
    the multimedia bar system being electronically connected to the at least one main computing device;
    the multimedia bar system comprises a bar body, a plurality of bar speakers, a plurality of first sponsor display panels, a pivoting projecting device, and a plurality of foghorns;
    the plurality of first sponsor display panels being distributed along the bar body;
    the plurality of bar speakers being laterally connected to the bar body;
    each of the plurality of bar speakers being oriented away from the bar body;
    the pivoting projecting device being positioned at a midpoint of the bar body;
    the plurality of foghorns being terminally mounted within the bar body;
    the plurality of foghorns being oriented away from the bar body; and
    the plurality of first sponsor display panels, plurality of bar speakers, pivoting projecting device, and the plurality of foghorns being electronically connected to the at least one main computing device.

2. The American football/rugby stadium multimedia goalpost as claimed in claim 1, wherein the at least one elevating support is a gooseneck support.

3. The American football/rugby stadium multimedia goalpost as claimed in claim 2 comprises:
    at least one rangefinder laser video camera;
    a pivoting projecting device;
    at least one speaker;
    the at least one rangefinder laser video camera being pivotably mounted to the gooseneck support;
    the pivoting projecting device and the at least one speaker being laterally connected to the gooseneck support, adjacent from the multimedia bar system; and
    the at least one rangefinder laser video camera, the pivoting projecting device, and the at least one speaker being electronically connected to the at least one main computing device.

4. The American football/rugby stadium multimedia goalpost as claimed in claim 1, wherein the at least one elevating support is a pair of vertical posts.

5. The American football/rugby stadium multimedia goalpost as claimed in claim 1 comprises:
    a retractable screen assembly;
    the retractable screen assembly comprises a motorized housing and a screen;
    the retractable screen assembly being integrated into the multimedia bar system; and
    the screen being operatively coupled to the motorized housing, wherein the motorized housing is used to externally deploy or internally withdrawn the screen from the motorized housing.

6. The American football/rugby stadium multimedia goalpost as claimed in claim 5, wherein the screen is electronically connected to the at least one main computing device.

7. The American football/rugby stadium multimedia goalpost as claimed in claim 5 comprises:
    a retractable underground projector;
    the retractable underground projector being positioned offset from the at least one elevating support;
    the retractable underground projector being oriented towards the retractable screen assembly; and
    the retractable underground projector being in optical communication with the screen.

8. The American football/rugby stadium multimedia goalpost as claimed in claim 1 comprises:
    a sports ball;
    a magnetic sensor array;

a plurality of magnets;
the plurality of magnets being integrated into the sports ball;
the magnetic sensor array being integrated into the goalpost frame;
the magnetic sensor array being operatively coupled to the plurality of magnets, wherein the magnetic sensor array is used to magnetically sense a proximity of the plurality of magnets to the goalpost frame; and
the magnetic sensor array being electronically connected to the at least one main computing device.

9. The American football/rugby stadium multimedia goalpost as claimed in claim 1 comprises:
a sports ball;
at least one rangefinder laser video camera;
the at least one rangefinder laser video camera being pivotably connected to the multimedia bar system;
the at least one rangefinder laser video camera being in optical communication with the sports ball; and
the at least one rangefinder laser video camera being electronically connected to the at least one main computing device.

10. The American football/rugby stadium multimedia goalpost as claimed in claim 1 comprises:
a sports ball;
a first upright camera;
a second upright camera;
the first upright camera being pivotably connected to the distal end of the first upright post;
the second upright camera being pivotably connected to the distal end of the second upright post;
the first upright camera and the second upright camera being in optical communication with the sports ball; and
the first upright camera and the second upright camera being electronically connected to the at least one main computing device.

11. The American football/rugby stadium multimedia goalpost as claimed in claim 1 comprises:
a plurality of second sponsor display panels;
the plurality of second sponsor display panels being connected along the first upright post, the second upright post, and the at least one elevating support; and
the plurality of second sponsor display panels being electronically connected to the at least one main computing device.

12. The American football/rugby stadium multimedia goalpost as claimed in claim 11 comprises:
at least one display panel housing;
the at least one display panel housing being connected along the first upright post and the second upright post; and
the plurality of second sponsor display panels being operatively coupled to the at least one display panel housing, wherein the at least one display panel housing is used to externally deploy or internally withdraw the plurality of second sponsor display panels from the at least one display panel housing.

13. The American football/rugby stadium multimedia goalpost as claimed in claim 1 comprises:
a visual recording system;
the visual recording system comprises a track, a motorized camera mount, and a video camera;
the visual recording system being positioned offset from the multimedia bar system;
the track being laterally connected to the at least one elevating support;
the motorized camera mount being slidably connected to the track;
the video camera being attached into the motorized camera mount; and
the motorized camera mount and the video camera being electronically connected to the at least one main computing device.

14. The American football/rugby stadium multimedia goalpost as claimed in claim 1 comprises:
a light emitting diode (LED) display scoring system;
the LED display scoring system being connected adjacent to the goalpost frame; and
the LED display scoring system being electronically connected to the at least one main computing device.

15. The American football/rugby stadium multimedia goalpost as claimed in claim 14 comprises:
the LED display scoring system comprises at least one LED strip, a first spotlight, and a second spotlight;
the at least one LED strip being connected along the first upright post, the second upright post, the crossbar, and the multimedia bar system;
the first spotlight being connected onto the distal end of the first upright post;
the first spotlight being oriented away from the first upright post;
the second spotlight being connected onto the distal end of the second upright post; and
the second spotlight being oriented away from the second upright post.

16. The American football/rugby stadium multimedia goalpost as claimed in claim 1 comprises:
a distance projector;
the distance projector being connected onto the multimedia bar system; and
the distance projector being electronically connected to the at least one main computing device.

17. The American football/rugby stadium multimedia goalpost as claimed in claim 1 comprises:
a padding; and
the padding being laterally connected around the at least one elevating support.

18. The American football/rugby stadium multimedia goalpost as claimed in claim 17 comprises:
an airbag system;
at least one proximity sensor;
the airbag system being operatively integrated into the padding, wherein the airbag system is used to deploy an airbag from the padding as a player approaches impact with the padding;
the airbag system being oriented away from the at least one elevating support;
the at least one proximity sensor being positioned offset from the padding; and
the airbag system and the at least one proximity sensor being electronically connected to the at least one main computing device.

* * * * *